United States Patent
Fraser-Beekman et al.

(10) Patent No.: US 11,047,305 B2
(45) Date of Patent: Jun. 29, 2021

(54) DEBRIS DEFLECTOR FOR A JET ENGINE

(71) Applicant: Stephanie Fraser-Beekman, Kissimmee, FL (US)

(72) Inventors: Stephanie Fraser-Beekman, Kissimmee, FL (US); Carl Beekman, Kissimmee, FL (US)

(*) Notice: Subject to any disclaimer, the term of this patent is extended or adjusted under 35 U.S.C. 154(b) by 222 days.

(21) Appl. No.: 16/379,984

(22) Filed: Apr. 10, 2019

(65) Prior Publication Data

US 2019/0316521 A1    Oct. 17, 2019

Related U.S. Application Data

(60) Provisional application No. 62/656,480, filed on Apr. 12, 2018.

(51) Int. Cl.
| | | |
|---|---|---|
| *F02C 7/055* | (2006.01) | |
| *B64D 33/02* | (2006.01) | |
| *F02C 7/042* | (2006.01) | |

(52) U.S. Cl.
CPC ............. *F02C 7/055* (2013.01); *B64D 33/02* (2013.01); *B64D 2033/022* (2013.01); *F02C 7/042* (2013.01)

(58) Field of Classification Search
CPC . F02C 7/055; F02C 7/042; F02C 7/05; B64D 2033/022; F05D 2260/607
See application file for complete search history.

(56) References Cited

U.S. PATENT DOCUMENTS

| | | | | |
|---|---|---|---|---|
| 3,196,598 | A | * | 7/1965 | Olson ..................... F02C 7/055 55/306 |
| 3,338,049 | A | * | 8/1967 | Fernberger ............... F02C 7/05 60/39.092 |
| 3,871,844 | A | | 3/1975 | Calvin |
| 4,149,689 | A | | 4/1979 | McDonald |
| 9,249,727 | B2 | * | 2/2016 | Matos ..................... F02C 7/055 |
| 2010/0180566 | A1 | | 7/2010 | Matos |
| 2010/0287908 | A1 | | 11/2010 | Cunningham |

FOREIGN PATENT DOCUMENTS

| | | | | |
|---|---|---|---|---|
| FR | 2344445 A1 | * | 10/1977 | ............. B64D 33/02 |
| FR | 2603946 A1 | * | 3/1988 | ............. B64D 33/02 |

* cited by examiner

*Primary Examiner* — Andrew H Nguyen
*Assistant Examiner* — Stephanie Sebasco Cheng
(74) *Attorney, Agent, or Firm* — Boudwin Intellectual Property; Daniel Boudwin

(57) ABSTRACT

A debris deflector for a jet engine. The debris deflector includes a housing having a base and a nose, wherein the housing tapers radially inwardly from the base towards the nose, such that the nose can deflect debris away from the housing. The housing includes a flexible shroud that extends between the base and the nose, such that the housing can selectively move between a collapsed position and an extended position, such that a linear distance between the nose and the base is less when in the collapsed position. A fastener is disposed on the base to removably secure the housing to a jet engine cowling. The debris deflector is useful for deflecting debris, such as wildlife or small aircraft, away from the jet engine during flight.

13 Claims, 4 Drawing Sheets

DEBRIS DEFLECTOR FOR A JET ENGINE

CROSS REFERENCE TO RELATED APPLICATIONS

This application claims the benefit of U.S. Provisional Application No. 62/656,480 filed on Apr. 12, 2018. The above identified patent application is herein incorporated by reference in its entirety to provide continuity of disclosure.

BACKGROUND OF THE INVENTION

The present invention relates to debris deflectors. More particularly, the present invention pertains to debris deflectors removably securable to a jet engine cowling, wherein a nose of the debris deflector is configured to deflect debris away from the housing, and wherein the debris deflector can selectively move between an extended position and a collapsed position.

Many people utilize jet airplanes to travel, however, jet engines are often prone to debris entering the jet engine cowling. This can lead to system malfunctions, engine damage, and in the event the malfunction is severe, extreme damage to ground structures, as well as injuries to passengers and civilians on the ground in the event of a crash. Typically, current jet airplanes are operated with minimal mechanisms to prevent debris from entering the jet engine. Existing solutions are bulky and significantly reduce air entering the jet engine, thereby reducing the efficiency of the engine. Therefore, there is a need for a device that maximizes air entering the jet engine while screening debris from entering the engine.

In light of the devices disclosed in the known art, it is submitted that the present invention substantially diverges in design elements from the known art and consequently it is clear that there is a need in the art for an improvement to existing debris deflectors. In this regard, the instant invention substantially fulfills these needs.

SUMMARY OF THE INVENTION

In view of the foregoing disadvantages inherent in the known types of debris deflectors now present in the known art, the present invention provides a debris deflector wherein the same can be utilized for providing convenience for the user when preventing debris from entering a jet engine of an airplane during a flight or operation of the airplane.

The present system comprises a housing having a base and a nose, wherein the housing tapers radially inwardly from the base towards the nose such that the nose is configured to deflect air away from the housing. A flexible shroud extends between the base and the nose. The housing is further configured to selectively move between an extended position and a retracted position, wherein a linear distance between the nose and the base is greater when in the extended position. At least one fastener is disposed on the base, wherein the fastener is configured to removably secure the housing to a jet engine cowling. In some embodiments, a plurality of concentric ribs extend along a length of the housing, wherein the plurality of concentric ribs are configured to provide support to the shroud. In another embodiment, the plurality of concentric ribs define discrete sections of the shroud, wherein each section extends between two adjacent ribs of the plurality of ribs. In other embodiments, a first rib of the plurality of ribs is directly affixed to a forward edge of the base. In yet another embodiment, a last rib of the plurality of ribs is directly affixed to a rear edge of the nose. In some embodiments, a diameter of each of the plurality of concentric ribs decrease from the base towards the nose. In another embodiment, the plurality of concentric ribs are configured to be coplanar when the housing is in the collapsed position. In other embodiments, the shroud comprises a mesh. In yet another embodiment, the fastener comprises a bracket configured to engage an interior of the jet engine cowling. In some embodiments, the bracket comprises a first section extending perpendicularly away from a second section, such that the first section is removably securable to an interior of a jet engine cowling. In another embodiment, the nose tapers to a point at a distal end thereof. In other embodiments, the nose comprises a first portion affixed to a second portion, wherein the first portion tapers radially inwardly at a rate greater than that of the second portion.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
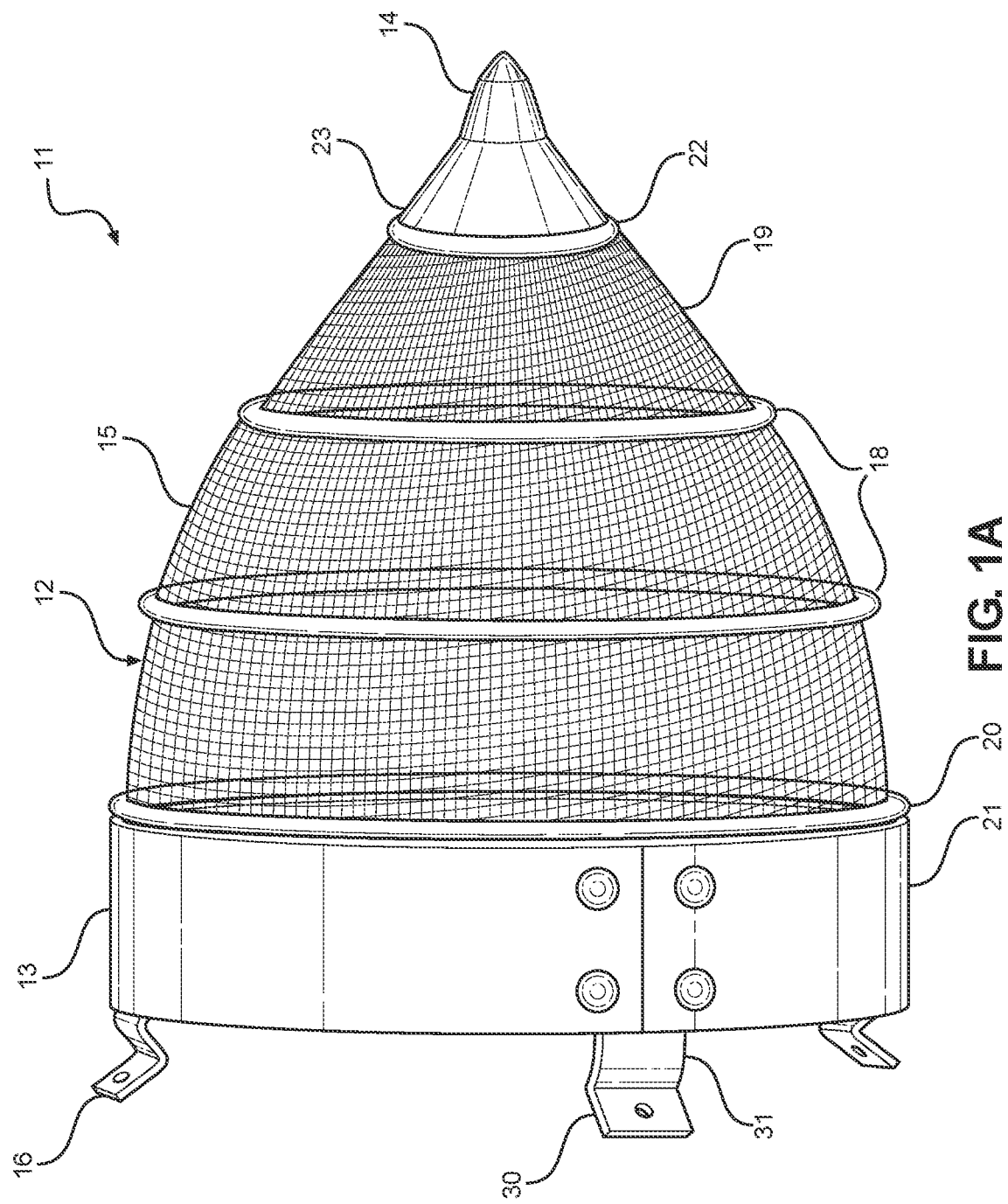
FIG. 1A shows a perspective view of an embodiment of the debris deflector for jet engines in an extended position.

Reference is made herein to the attached drawings. Like reference numerals are used throughout the drawings to depict like or similar elements of the debris deflector. The figures are intended for representative purposes only and should not be considered to be limiting in any respect.

Figure 1C:
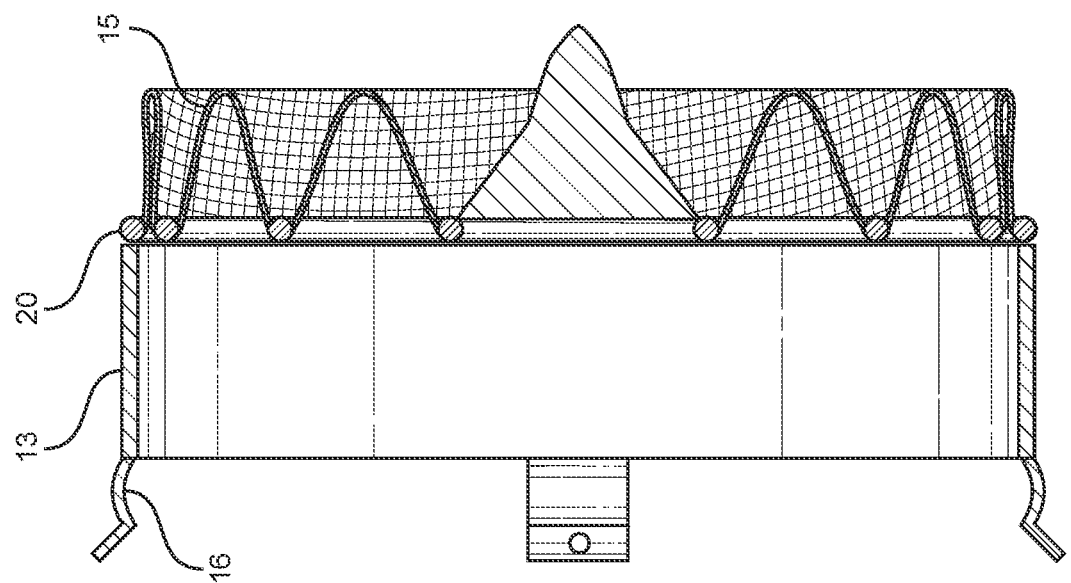
FIG. 1C shows a cross-sectional view of an embodiment of the debris deflector for jet engines in a collapsed position.
Figure 1B:
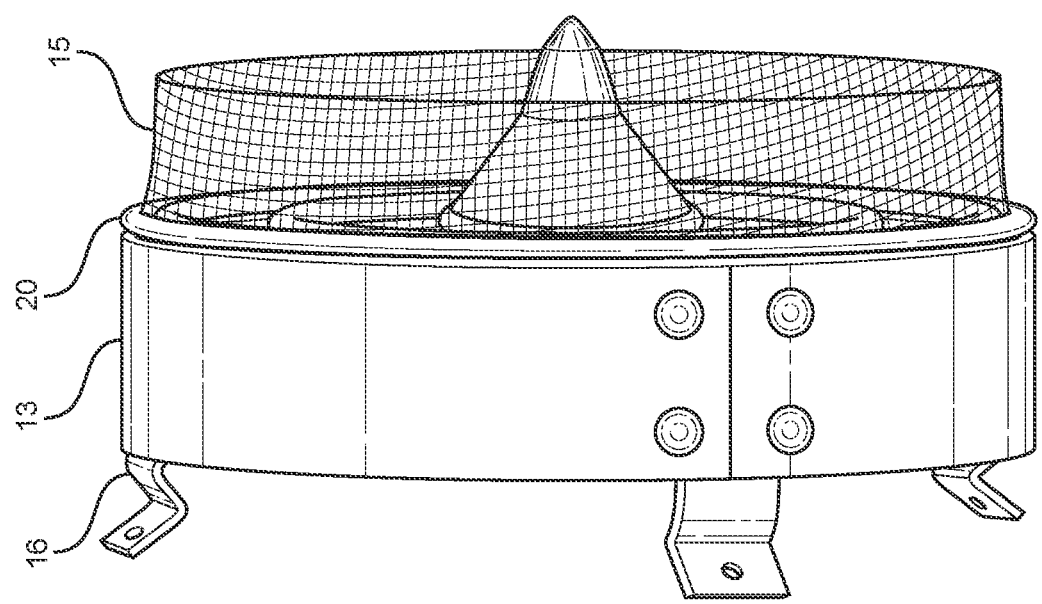
FIG. 1B shows a perspective view of an embodiment of the debris deflector for jet engines in a collapsed position.

Referring now to FIGS. 1A, 1B, and 1C, there are shown a perspective view of an embodiment of the debris deflector for jet engines in an extended position, a perspective view of an embodiment of the debris deflector for jet engines in a collapsed position, and a cross-sectional view of an embodiment of the debris deflector for jet engines in a collapsed position, respectively. The debris deflector 11 comprises a housing 12 having a base 13 and a nose 14 on opposing ends thereof. The housing 12 is configured to removably secure to an existing jet engine, such that the debris deflector 11 can prevent unwanted debris or other objects from entering the jet engine while in use. The housing 12 tapers radially inwardly from the base 13 towards the nose 14, such that the debris deflector 11 comprises an aerodynamic form factor configured to minimize inefficiencies generated by adding mass and structure to the existing jet engine. Additionally, the tapering of the housing 12 (i.e., from the base 13 to the nose 14) further serves to deflect debris impacting towards the nose 14 of the housing 12 tangentially outward away from the base 13.

The debris deflector 11 further comprises a shroud 15 extending between the base 13 and the nose 14. The shroud 15 is configured to be flexible to allow the housing 12 to selectively move between an extended position and a retracted position, such that a linear distance between the base 13 and the nose 14 is greater when the housing 12 is in the extended position. In the illustrated embodiment, the shroud 15 comprises a mesh screen having a plurality of apertures therein, such that the mesh screen is configured to allow air to pass therethrough, while filtering out larger objects and debris. In this way, the jet engine receives enough air to operate, thereby minimizing inefficiencies generated by impeding airflow into the jet engine, while also preventing unwanted debris or objects from entering the jet engine. Additionally, the mesh material of the shroud 15 in the illustrated embodiment reduces overall weight of the debris deflector 11, allowing for easier transport and installation of the device and minimizing additional weight added to the plane in use.

In the illustrated embodiment, the debris deflector 11 further comprises a plurality of concentric ribs 18 affixed to the shroud 15, such that the plurality of concentric ribs 18 provide support thereto. A diameter of each of the plurality of concentric ribs 18 decreases from the base 13 to the nose 14, such that the plurality of concentric ribs 18 follows the tapering of the housing 12. In the illustrated embodiment, a first rib 20 of the plurality of concentric ribs 18 is directly affixed to a forward edge 21 of the base 13, ensuring that the shroud 15 is properly anchored to the base 13. Similarly, in the illustrated embodiment, a last rib 22 of the plurality of concentric ribs 18 is directly affixed to a rear edge 23 of the nose 14 to ensure that the shroud 15 is properly anchored to the nose 14. In some embodiments, the shroud 15 encases the plurality of concentric ribs 18 to ensure that the shroud 15 maintains the desired conical shape, however, in the illustrated embodiment, the shroud 15 is affixed to each subsequent rib of the plurality of concentric ribs 18, thereby defining discrete sections 19 of the shroud 15. The discrete sections 19 allow the shroud 15 to more easily collapse, as each discrete section 19 is independent of the positioning of the remaining discrete sections 19. In this way, one discrete section 19 can be in an extended position, while another is in a collapsed position, thereby allowing a user to determine the most efficient position for operation. In some embodiments, the debris deflector 11 does not contain any supports perpendicular to the plurality of concentric ribs 18, such that the entirety of the shroud 15 is supported thereby. In this way, the debris deflector 11 can deform upon impact with debris, further attenuating any force imparted thereby.

The housing 12 is configured to selectively move between an extended position and a collapsed position, such that a user can more easily transport and store the debris deflector 11 when not actively in use. As shown in the embodiment of FIG. 1B, the plurality of concentric ribs 18 are configured to occupy the same plane when in the collapsed position, such that each subsequent rib of the plurality of concentric ribs 18 fits securely within the previous rib. In some embodiments, the plurality of concentric ribs 18 are configured to frictionally engage each other when in the collapsed position, thereby ensuring that the housing 12 remains in the collapsed position until desired.

Figure 3:
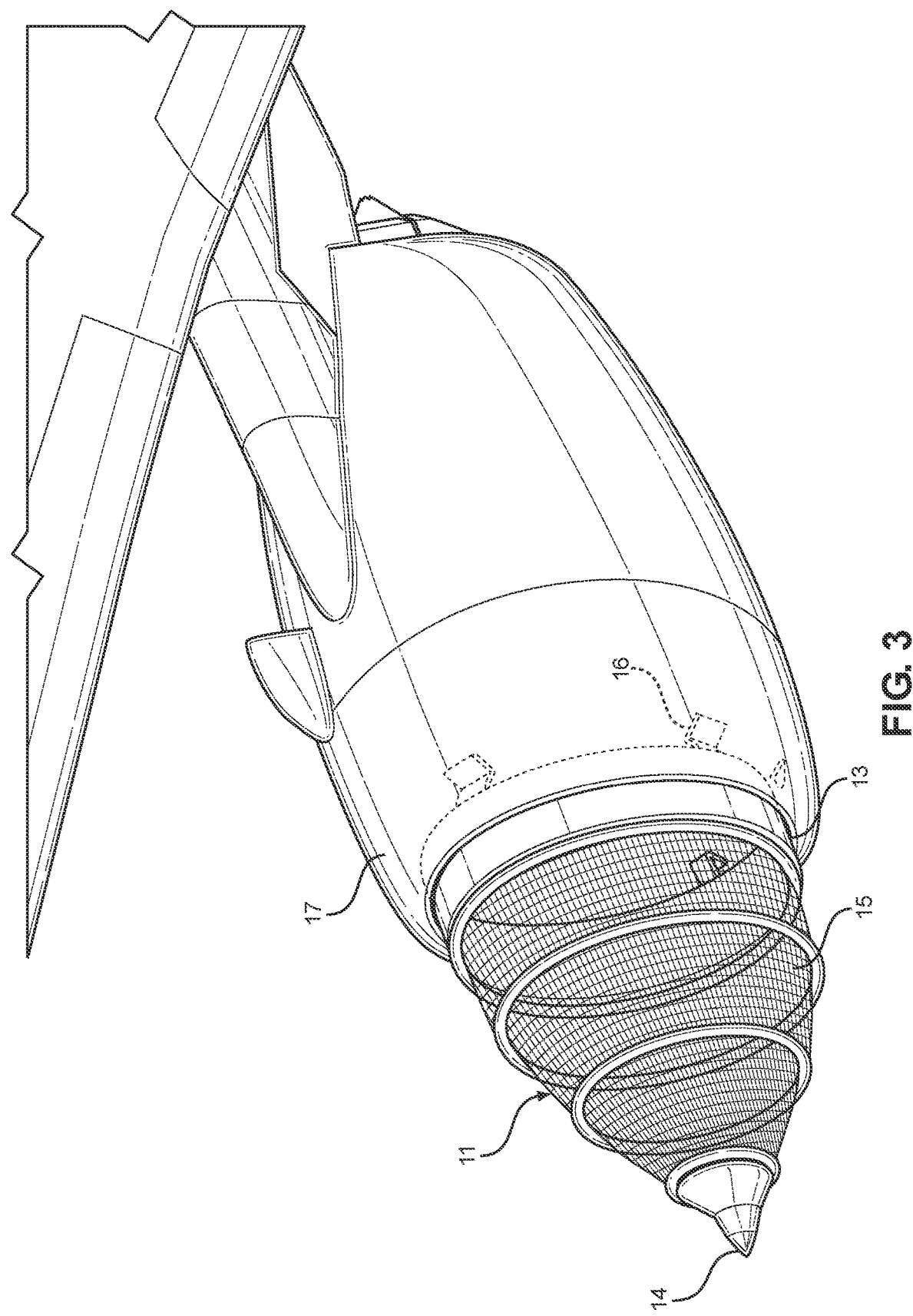
FIG. 3 shows a semi-transparent view of an embodiment of the debris deflector for jet engines affixed to a jet engine.

In the illustrated embodiment, the debris deflector 11 further comprises a plurality of fasteners 16 affixed to the base 13. The fasteners 16 are configured to removably secure the housing 12 to a jet engine cowling (as shown in FIG. 3, 17). In the illustrated embodiment, the fasteners 16 comprise brackets having a first section 30 extending perpendicularly away from a second section 31, wherein the first section 30 extends radially outward from the housing 12. In this way, the bracket can abut an interior surface of a jet engine cowling. In some embodiments, the debris deflector 11 can be removably secured within the jet engine cowling via friction fit, however, in the illustrated embodiment, the first section 30 further comprises at least one aperture thereon, the aperture configured to receive a securing fastener, such as a bolt, screw, or the like, therethrough, such that the securing fastener secures the housing 12 to the jet engine cowling. In the illustrated embodiment, the second section 31 comprises an arcuate shape curving radially inwardly relative to the housing 12, such that the first section 30 is positioned in a desired position to more readily secure to existing jet engine cowlings. Furthermore, the arcuate shape of the second section 31 facilitates embodiments relying on friction fit to secure the housing 12 to a jet engine, as the arcuate shape imparts a spring-biased relationship to the fastener 16, allowing the fastener 16 to bend inwardly along the curve until it passes a lip of the engine cowling, at which point the first section 30 engages the lip.

Figure 2:
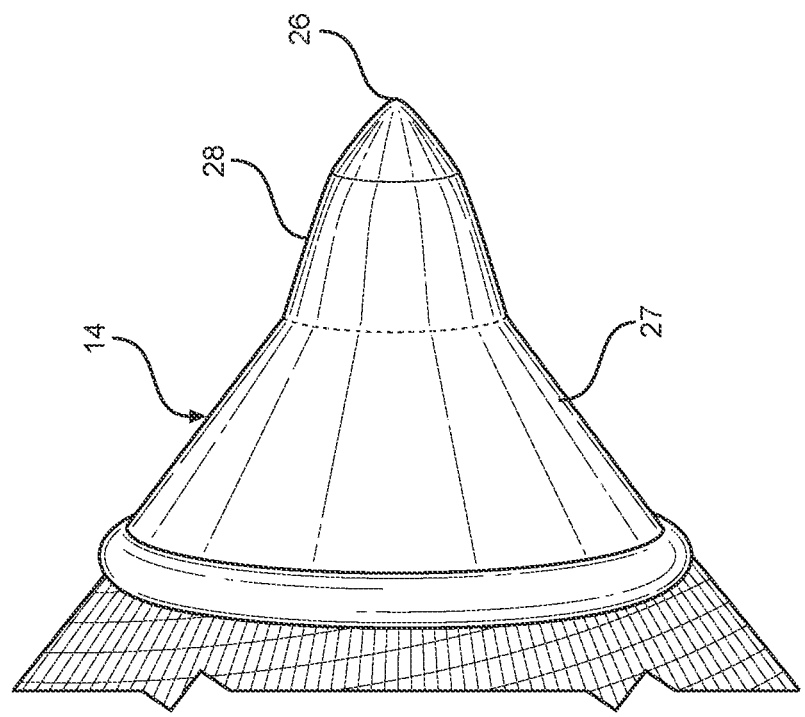
FIG. 2 shows a close up view of the nose of an embodiment of the debris deflector for jet engines.

Referring now to FIG. 2, there is shown a close up view of the nose of an embodiment of the debris deflector for jet engines. In the illustrated embodiment, the nose 14 comprises a first section 27 and a second section 28, wherein the first and second sections 27, 28 taper at different rates. The first section 27 tapers at a steeper rate than the second section 28, such that debris impacting the second section 28 is directed tangentially away from the housing. In this way, directly impacted debris is immediately shunted away from the jet engine, while the shroud prevent debris from entering at oblique angles relative to the housing. The second section 28 tapers to a point at a distal end 26 thereof. In this way, drag caused by the nose 14 is minimized, ensuring maximized efficiency during use.

Referring now to FIG. 3, there is shown a semi-transparent view of an embodiment of the debris deflector for jet engines affixed to a jet engine. In one exemplary use, the user removably secures the debris deflector 11 to the jet engine cowling 17. The base 13 is inserted into the jet engine cowling 17, such that the fasteners 16 engage an interior thereof. In some embodiments, the fasteners 16 are configured to frictionally engage an interior lip of the jet engine cowling 17, while in alternate embodiments, the fasteners 16 include apertures therethrough to receive a securing fastener, such that the debris deflector 11 is affixed to the jet engine cowling thereby. During flight, any debris drawn towards the jet engine is prevented from entering the engine due to the mesh shroud 15, while air is still allowed to pass through, ensuring the engine receives the required air to operate efficiently. Debris directly impacting the nose 14 is diverted from the jet engine due to the tapering shape of the debris deflector 11. As the debris deflector 11 tapers from the base 13 towards the nose 14, the aerodynamic properties of the plane are minimally impacted by the inclusion of the debris deflector 11. When not in use, the user can remove the debris deflector 11 and collapse the debris deflector 11 to minimize the form factor thereof for storage and ease of transport.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A debris deflector for a jet engine, comprising:
   a housing having a base centered about a centerline axis and a nose;
   wherein the housing tapers radially inwardly relative to the centerline axis from the base towards the nose when the housing is in an extended position, such that the nose is configured to deflect debris away from the housing;
   wherein the housing is a flexible shroud extending from the base to the nose;
   wherein the housing is configured to selectively move between a collapsed position and the extended position;
   wherein a linear distance along the centerline axis from the base to the nose is greater when the housing is in the extended position than when the housing is in the collapsed position;
   a fastener disposed on the base, wherein the fastener is configured to removably secure the housing to a jet engine cowling.

2. The debris deflector of claim 1, further comprising a plurality of concentric ribs distributed over a length of the housing, wherein the plurality of concentric ribs is configured to provide support to the flexible shroud.

3. The debris deflector of claim 2, wherein the plurality of concentric ribs defines discrete sections of the flexible shroud, wherein each section extends between two adjacent ribs of the plurality of concentric ribs.

4. The debris deflector of claim 2, wherein a first rib of the plurality of concentric ribs is directly affixed to a forward edge of the base.

5. The debris deflector of claim 2, wherein a last rib of the plurality of concentric ribs is directly affixed to a rear edge of the nose.

6. The debris deflector of claim 2, wherein each of the plurality of concentric ribs comprises a diameter and the diameters decrease from the base towards the nose.

7. The debris deflector of claim 2, wherein the plurality of concentric ribs are configured to be coplanar when the housing is in the collapsed position.

8. The debris deflector of claim 1, wherein the shroud comprises a mesh.

9. The debris deflector of claim 1, wherein the fastener comprises a bracket configured to engage an interior of the jet engine cowling.

10. The debris deflector of claim 9, wherein the bracket comprises a first section extending perpendicularly away from a second section, such that the first section is removably securable to the interior of the jet engine cowling.

11. The debris deflector of claim 10, wherein the second section comprises an arcuate shape curving radially inwardly toward the centerline axis from the base.

12. The debris deflector of claim 1, wherein the nose tapers to a point at a distal end thereof.

13. The debris deflector of claim 12, wherein the nose comprises a first portion affixed to a second portion, wherein the first portion tapers radially inwardly relative to the centerline axis at a rate greater than that of the second portion.

* * * * *